United States Patent Office.

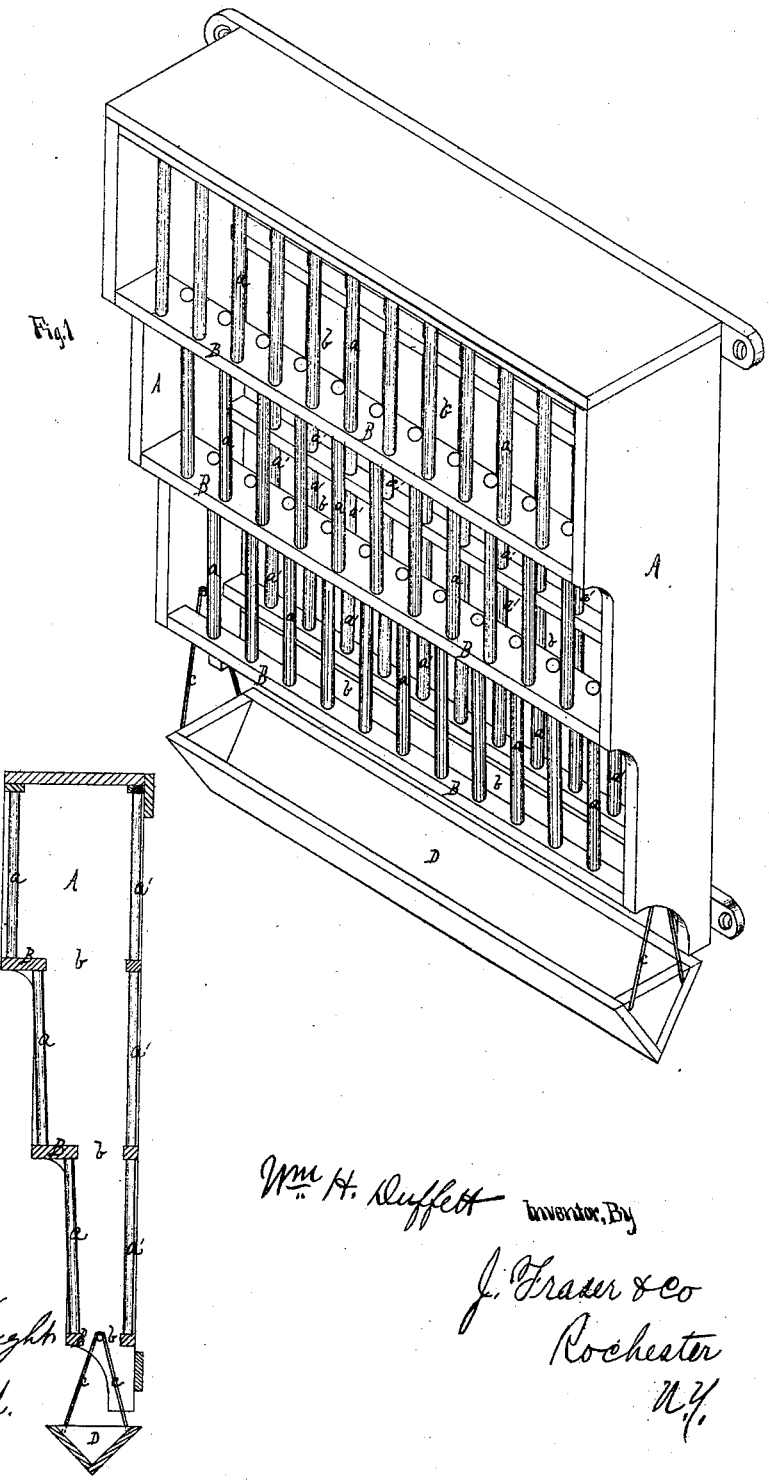

WILLIAM H. DUFFETT, OF ROCHESTER, NEW YORK.

Letters Patent No. 113,862, dated April 18, 1871.

IMPROVEMENT IN DISH-RACKS.

The Schedule referred to in these Letters Patent and making part of the same.

*To all whom it may concern:*

Be it known that I, WILLIAM H. DUFFETT, of the city of Rochester, in the county of Monroe and State of New York, have invented a certain new and useful Improvement in Dish-Racks, of which the following is a specification.

Nature of the Invention.

This invention consists of a rack for holding dishes after being washed, constructed, arranged, and operating as hereinafter described.

General Description.

In the drawing—

Figure 1 is a perspective view, and

Figure 2 a vertical transverse section.

The rack is composed of side pieces A A, having a series of graduating shelves, B B, which decrease in projection from top to bottom.

Each of the shelves has upright rounds or slats $a\ a\ a'\ a'$ at front and rear, between which the plates or other dishes are placed, after being washed and rinsed, for the purpose of drying.

A space, $b$, is also left between the front and rear side of each shelf, to allow a free passage of the drippings from top to bottom.

At the bottom of the rack is a trough or receptacle, D, which rests beneath the spaces $b$, for the purpose of catching the drippings. It is hung by pendent loops, $c\ c$, in such a manner that it may be inverted, when desired to discharge the water, without removing it from place.

In some cases the rack may be situated over a sink, which will catch the drippings.

The rack is attached to the wall by means of screws or otherwise.

The dishes are simply washed, rinsed, and placed in the rack, as before described, to dry. They need no wiping, and are left in better order than if wiped.

The rack is simply made of wood, which will not corrode, and is easily kept clean.

I am aware that racks or receptacles made of wire have been used, but not involving the construction I have above described.

The double-slotted faces $a\ a'$ of the shelves allow the easy insertion or removal of the dishes, and the open bottoms $b\ b$ of the shelves allow the water to drain off rapidly, and without obstruction, from top to bottom.

I also claim a special advantage in the use of the trough or receptacle D, which catches the drippings and discharges by simply inverting.

Claim.

What I claim, and desire to secure by Letters Patent as a new article of manufacture, is—

The dish-rack A A, having the slatted faces $a\ a'$ arranged in a series of graduated shelves, with the bottoms $b\ b$ open, and having the pendent trough or receptacle D, the whole as herein described.

W. H. DUFFETT.

Witnesses:
 R. F. OSGOOD,
 C. N. WOODWARD.